US010684484B2

(12) United States Patent
Yoshida

(10) Patent No.: US 10,684,484 B2
(45) Date of Patent: *Jun. 16, 2020

(54) WEARABLE DISPLAY, CASING FOR A WEARABLE DISPLAY, AND MANUFACTURING METHOD FOR A WEARABLE DISPLAY

(71) Applicant: SONY CORPORATION, Tokyo (JP)

(72) Inventor: Takaaki Yoshida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,435

(22) Filed: Jul. 17, 2019

(65) Prior Publication Data

US 2019/0339534 A1 Nov. 7, 2019

Related U.S. Application Data

(63) Continuation of application No. 15/307,613, filed as application No. PCT/JP2015/006139 on Dec. 9, 2015, now Pat. No. 10,409,072.

(30) Foreign Application Priority Data

Mar. 9, 2015 (JP) ................. 2015-045414

(51) Int. Cl.
G02B 27/14 (2006.01)
G02B 27/01 (2006.01)
F21V 8/00 (2006.01)

(52) U.S. Cl.
CPC ......... G02B 27/0176 (2013.01); G02B 6/003 (2013.01); G02B 6/0011 (2013.01);
(Continued)

(58) Field of Classification Search
CPC ............ A63B 2071/0658; A63F 13/25; G02B 27/0176; G02B 6/0011; G02B 6/0031;
(Continued)

(56) References Cited

U.S. PATENT DOCUMENTS

2010/0026970 A1* 2/2010 Tanaka ............... G02B 27/0176
353/81
2015/0338660 A1 11/2015 Mukawa
(Continued)

FOREIGN PATENT DOCUMENTS

CN 104007502 A 8/2014
CN 104204905 A 12/2014
(Continued)

OTHER PUBLICATIONS

International Search Report and Written Opinion of PCT Application No. PCT/JP2015/006139, dated Mar. 8, 2016, 06 pages of English Translation and 06 pages of ISRWO.
(Continued)

Primary Examiner — Alicia M Harrington
(74) Attorney, Agent, or Firm — Chip Law Group

(57) ABSTRACT

A wearable display includes a first optical section, a main body, and a jig receiver. The first optical section emits light. The main body includes a second optical section that is connected to the first optical section and outwardly emits the light as image light, and a casing that supports the second optical section. The jig receiver includes a first guide that supports a first protrusion of a jig, a second guide that supports a second protrusion of the jig, and a third guide that supports a third protrusion of the jig. The jig receiver is provided in the casing such that at least two of the first, second, and third guides are spaced apart from each other in the first axis direction and at least two of the first, second, and third guides are spaced apart from each other in the third axis direction.

16 Claims, 12 Drawing Sheets

(52) U.S. Cl.
CPC ......... *G02B 6/0031* (2013.01); *G02B 6/0036* (2013.01); *G02B 27/0103* (2013.01); *G02B 27/0172* (2013.01); *G02B 2027/0105* (2013.01); *G02B 2027/0178* (2013.01)

(58) Field of Classification Search
CPC .............. G02B 27/0103; G02B 6/0036; G02B 27/0172; G02B 6/003; G02B 2027/0178; G02B 2027/0105; A47B 57/30; A47F 3/00; A47F 5/0006; A47F 7/00; A47F 7/02; A47F 7/021; A47F 11/00
See application file for complete search history.

(56) References Cited

U.S. PATENT DOCUMENTS

| | | | |
|---|---|---|---|
| 2015/0378163 A1 | 12/2015 | Hiraide | |
| 2017/0363875 A1* | 12/2017 | Yoshida | ............. G02B 27/0103 |

FOREIGN PATENT DOCUMENTS

| | | |
|---|---|---|
| EP | 2945002 A1 | 11/2015 |
| EP | 2959335 A2 | 12/2015 |
| JP | 09-266554 A | 10/1997 |
| JP | 2014-164020 A | 9/2014 |
| KR | 10-2015-0105941 A | 9/2015 |
| KR | 10-2015-0119410 A | 10/2015 |
| WO | 2014/109115 A1 | 7/2014 |
| WO | 2014/129133 A2 | 8/2014 |

OTHER PUBLICATIONS

Notice of Allowance for U.S. Appl. No. 15/307,613, dated Apr. 17, 2019, 09 pages.

International Preliminary Report on Patentability of PCT Application No. PCT/JP2015/006139, dated Sep. 21, 2017, 06 pages of English Translation and 03 pages of IPRP.

* cited by examiner

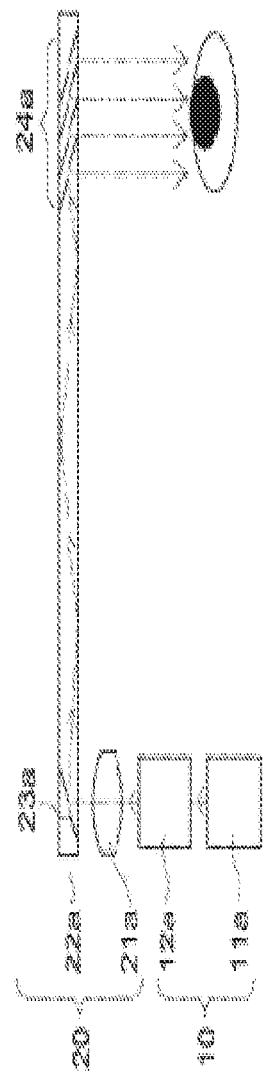
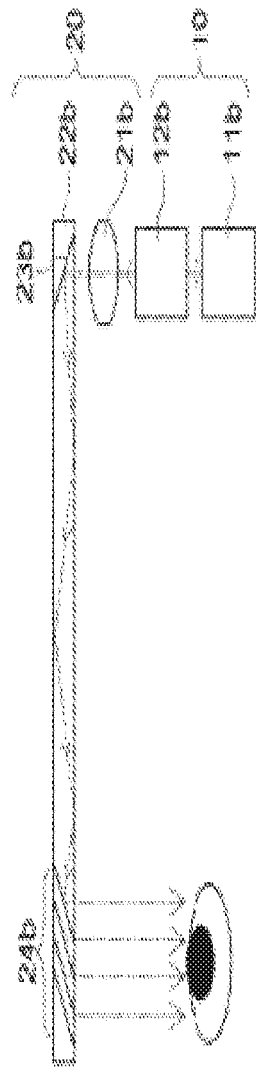

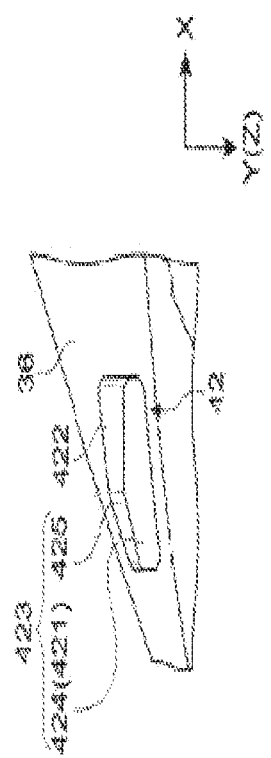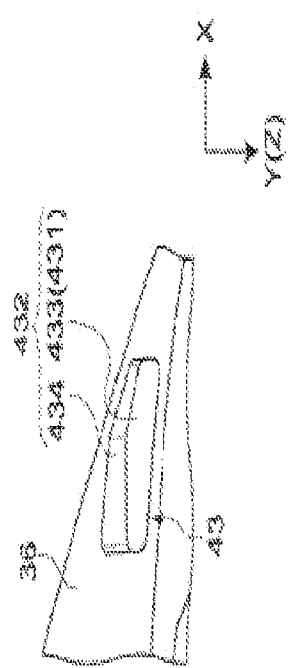

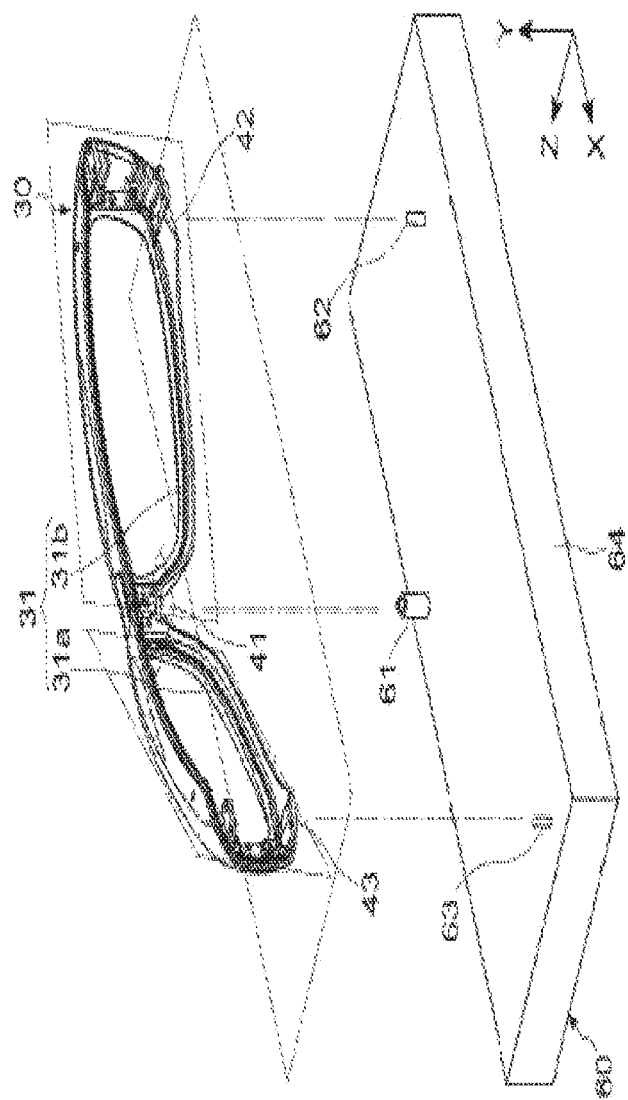

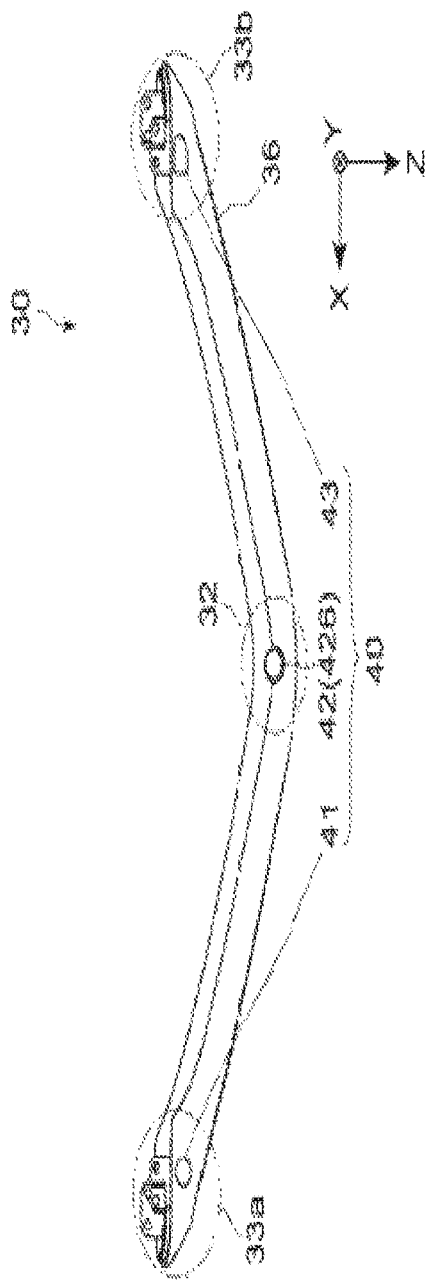

WEARABLE DISPLAY, CASING FOR A WEARABLE DISPLAY, AND MANUFACTURING METHOD FOR A WEARABLE DISPLAY

CROSS REFERENCE TO RELATED APPLICATIONS

The present application is a continuation application of U.S. patent application Ser. No. 15/307,613, filed Oct. 28, 2016, which is a national stage entry of PCT/JP2015/006139 filed Dec. 9, 2015, which claims priority from Japanese Priority Patent Application JP 2015-045414 filed in the Japan Patent Office on Mar. 9, 2015, the entire contents of which are hereby incorporated by reference.

TECHNICAL FIELD

The present technology relates to a wearable display that can be mounted mainly on user's head, a manufacturing method therefor, and a casing for a wearable display.

BACKGROUND ART

Conventionally, a head-mounted type display (hereinafter, referred to as head mount display (HMD)) is known. As an image display apparatus used for the HMD, the following configurations in which an image can be displayed in front of the eyes of the user have been disclosed.

For example, Patent Document 1 describes a virtual-image display apparatus (image display apparatus). The virtual-image display apparatus (image display apparatus) for enabling a viewer to view a two-dimensional image, which is formed by an image formation apparatus, as an enlarged image through a virtual-image optical system.

Further, for example, Patent Document 2 describes a virtual-image display apparatus (image display apparatus) using a hologram diffraction grating in order to enable the viewer to view a two-dimensional image, which is formed by an image formation apparatus, as an enlarged image through a virtual-image optical system.

By the way, if mounted on the user's head or the like as the HMD, the image display apparatus may be attached to an eyeglasses-shaped frame (see FIG. 30 or the like in Patent Document 3). As described in Patent Document 3, in the HMD, the viewer feels fatigue if the spatial position of an image generated from light emitted from a light guiding means of the image display apparatus changes due to shape change or the like of the frame when worn.

In addition, Patent Document 3 describes an HMD in which two left and right image display apparatuses are coupled through a coupling member separate from the eyeglasses-shaped frame, as a means for solving the problem above.

Patent Document 1: Japanese Patent Application Laid-open No. 2006-162767
Patent Document 2: Japanese Patent Application Laid-open No. 2007-94175
Patent Document 3: Japanese Patent Application Laid-open No. 2010-145859

SUMMARY

Problem to be Solved

In general, in a manufacturing process for an HMD, a frame (casing) is placed on a jig and then optical components are attached to the frame. If the frame is not placed in a desired attitude with respect to the jig, the optical components are erroneously arranged. Therefore, there has been a possibility that the spatial position of a generated image may change.

However, in Patent Documents 1 to 3, the positional accuracy between the optical components when assembled has not been considered.

In view of the above-mentioned circumstances, it is an object of the present technology to provide a wearable display by which the positional accuracy between optical components when assembled can be improved, a manufacturing method therefor, and a casing for a wearable display.

Means for Solving the Problem

In order to achieve the above-mentioned object, a wearable display according to an embodiment of the present technology includes a first optical section, a main body, and a jig receiver.

The first optical section is configured to be capable of emitting light.

The main body includes a second optical section that is connected to the first optical section and capable of outwardly emitting the light as image light, and a casing that supports the second optical section.

The jig receiver includes a first guide, a second guide, and a third guide.

The first guide is configured to be capable of supporting a first protrusion of a jig while determining a position of the first protrusion in each direction of a first surface crossing a first axis direction, a second surface crossing a second axis direction orthogonal to the first axis direction, and a third surface crossing a third axis direction orthogonal to each of the first and second axis directions.

The second guide is configured to be capable of supporting a second protrusion of the jig while determining a position of the second protrusion in each direction of a fourth surface crossing the second axis direction and a fifth surface crossing the third axis direction, and The third guide is configured to be capable of supporting a third protrusion of the jig while determining a position of the third protrusion in a direction of a sixth surface crossing the second axis direction.

The jig receiver is provided in the casing such that at least two of the first, second, and third guides are spaced apart from each other in the first axis direction and at least two of the first, second, and third guides are spaced apart from each other in the third axis direction.

The first guide can limit displacement with respect to the first protrusion of the jig in the first, second, and third axis directions, with the first, second, and third surfaces.

The second guide can limit displacement with respect to the second protrusion of the jig in the third axis direction, with the fifth surface. In addition, the second guide is spaced apart from at least either one of the first and third guides in the first axis direction. With this, the second guide can limit rotation with respect to the jig around a second axis about the first guide or the third guide, from which the second guide is spaced apart.

Further, the second guide can limit displacement with respect to the second protrusion of the jig in the second axis direction, with the fourth surface. The third guide can limit displacement with respect to the third protrusion of the jig in the second axis direction, with the sixth surface. In addition, the second guide is spaced apart from at least another guide in each of the first and third axis directions. The third guide is also spaced apart from the at least other guide in each of the first and third axis directions. Accordingly, the second and third guides can limit rotation with respect to the jig about the guide, from which the second and third guides are spaced apart, around a first axis and a third axis.

In this manner, the jig receiver can limit the displacement of the casing with respect to the jig in the three axis directions and the rotation of the casing with respect to the jig around the three axes and can regulate the position of the main body with respect to the jig with high accuracy. Therefore, when the casing is placed on the jig and the second optical section and the first optical section, which are attached to the casing, connected to each other, it is possible to improve the positional accuracy thereof.

Further, the casing may include
a center portion,
a first end portion spaced from the center portion in the first and third axis directions, and
a second end portion arranged symmetrically to the first end portion with respect to a plane which passes through the center portion and is orthogonal to the first axis direction, and
the first guide, the second guide, and the third guide may be arranged respectively corresponding to any one of the center portion, the first end portion, and the second end portion in a one-to-one relationship.

With this, a distance between each of the second and third guides and the other guide, which are spaced apart from each other in each of the first and third axis directions, can be set as long as possible. With this, it is possible to keep rotational angles of the casing around the first and third axes small, which are based on the displacement of the second and third guides with respect to the jig in the second axis direction. Therefore, it is possible to more effectively limit the rotation of the casing around the first and third axes.

In this case, the first guide may be arranged at the center portion, and the second guide and the third guide may be arranged respectively corresponding to either one of the first end portion and the second end portion in a one-to-one relationship.

Further, the wearable display may further include:
a first light transmitting plate arranged corresponding to a left eye of a user; and
a second light transmitting plate arranged corresponding to a right eye of the user, in which
the second optical section may include at least one of the first light transmitting plate
and the second light transmitting plate, and
the casing may include
a first support that supports the first light transmitting plate and is arranged between the center portion and the first end portion, and
a second support that supports the second light transmitting plate and is arranged between the center portion and the second end portion.
With this, the casing can be formed in an eyeglass frame shape.

Further, the casing may include
an upper surface capable of being arranged facing a head side of the user when worn, and
a bottom surface that is opposed to the upper surface in the second axis direction and capable of being arranged facing a foot side of the user when worn, and
the jig receiver may be provided in the bottom surface.

With this, when assembled, the jig can be placed on a bottom surface side, and the casing can be kept in the same attitude as that when worn. Further, the aesthetic appearance thereof can be improved by providing the jig receiver in the bottom surface difficult to see.

The first guide further may include
a hole portion having an inner peripheral surface including the first surface and the third surface, and
the second surface may be configured as a flat surface continuous with the hole portion.

With this, by inserting the first protrusion having a shaft shape into the hole portion and bring the step portion, the end surface, and the like of the first protrusion into contact with the second surface, it is possible to regulate the position of the first guide with respect to the first protrusion.

More specifically, the second surface may be formed in the bottom surface, and
the hole portion may be configured as a through-hole formed toward the upper surface from the second surface.

With this, the first guide can be configured in a space-saving manner, and it is possible to increase the degree of freedom of configurations other than the first guide.

On the other hand, specifically, the second guide may further include
a first recess portion including
a first depressed surface including the fourth surface, and
a side surface that includes the fifth surface and is continuous with the fourth surface, the first recess portion being formed toward the upper surface from the bottom surface.

With this, by bringing the end surface of the second protrusion having a shaft shape into contact with the first depressed surface and bringing a peripheral surface into contact with the side surface, for example, it is possible to regulate the position of the second guide with respect to the second protrusion.

On the other hand, the third guide may further include
a second recess portion including
a second depressed surface including the sixth surface, the second recess portion being formed toward the upper surface from the bottom surface.

With this, by bringing the end surface of the third protrusion having a shaft shape into contact with the second depressed surface, for example, it is possible to regulate the position of the third guide with respect to the third protrusion.

In addition, the second optical section may include a first light guiding plate capable of outwardly emitting image light for a left eye, and a second light guiding plate capable of outwardly emitting image light for a right eye.

With this, the image for the left eye and the image for the right eye can be presented to the user at the same time, and it is possible to generate a stereoscopic image, for example.

Alternatively, the second optical section may include
a light guiding plate capable of outwardly emitting image light for at least either one of a left eye and a right eye.

With this, it is possible to simplify the configuration of the second optical section.

A casing for a wearable display according to another embodiment of the present technology is capable of outwardly emitting image light and includes a jig receiver. The jig receiver includes a first guide, a second guide, and a third guide.

The first guide is configured to be capable of supporting a first protrusion of a jig while determining a position of first protrusion in each direction of a first surface crossing a first axis direction, a second surface crossing a second axis direction orthogonal to the first axis direction, and a third surface crossing a third axis direction orthogonal to each of the first and second axis directions, The second guide is configured to be capable of supporting a second protrusion of the jig while determining a position of the second protrusion in each direction of a fourth surface crossing the second axis direction and a fifth surface crossing the third axis direction, and The third guide is configured to be capable of supporting a third protrusion of the jig while determining a position of the third protrusion in a direction of the sixth surface crossing the second axis direction.

The jig receiver is provided in the casing such that at least two of the first, second, and third guides are spaced apart from each other in the first axis direction and at least two of the first, second, and third guides are spaced apart from each other in the third axis direction.

A manufacturing method for a wearable display according to still another embodiment of the present technology is a manufacturing method for a wearable display including a first optical section, a main body, and a jig receiver.

The first optical section is configured to be capable of emitting light.

The main body includes a second optical section that is connected to the first optical section and capable of outwardly emitting the light as image light, and a casing that supports the second optical section.

The jig receiver includes a first guide, a second guide, and a third guide.

The first guide configured to be capable of supporting a first protrusion of a jig while determining a position of the first protrusion in each direction of a first surface crossing a first axis direction, a second surface crossing a second axis direction orthogonal to the first axis direction, and a third surface crossing a third axis direction orthogonal to each of the first and second axis directions.

The second guide is configured to be capable of supporting a second protrusion of the jig while determining a position of the second protrusion in each direction of a fourth surface crossing the second axis direction and a fifth surface crossing the third axis direction.

The third guide is configured to be capable of supporting a third protrusion of the jig while determining a position of the third protrusion in a direction of a sixth surface crossing the second axis direction.

The jig receiver is provided in the casing such that at least two of the first, second, and third guides are spaced apart from each other in the first axis direction and at least two of the first, second, and third guides are spaced apart from each other in the third axis direction.

The manufacturing method for a wearable display includes a step of forming the main body.

The main body is placed on the jig with the first protrusion being supported by the first, second, and third surfaces of the first guide, the second protrusion being supported by the fourth and fifth surfaces of the second guide, and the third protrusion being supported by the sixth surface of the third guide, and the first optical section is connected to the second optical section.

As described above, the jig receiver can limit the displacement of the casing with respect to the jig in the three axis directions and the rotation of the casing with respect to the jig around the three axes and can regulate the attitude of the main body with respect to the jig with high accuracy. Therefore, in a step in which the casing is placed on the jig and the second optical section and the first optical section, which are attached to the casing, connected to each other, it is possible to improve the positional accuracy thereof.

The step of forming the main body may include forming a casing in which the jig receiver is formed, and attaching the second optical section to the casing.

With this, it is possible to form the jig receiver before the second optical section is attached.

The step of forming a casing in which the jig receiver is formed may include forming the jig receiver and a support capable of supporting the second optical section, in the casing, removably attaching a temporary optical section capable of being supported by the support, to the casing, and placing the casing, to which the temporary optical section is attached, on the jig, measuring an attitude of the temporary optical section, and adjusting a shape of the jig receiver on the basis of a measurement result.

With this, in the subsequent step in which the first optical section and the second optical section are connected to each other, it is possible to further improve the positional accuracy between the first optical section and the second optical section.

Further, the step of forming a casing in which the jig receiver is formed may include molding the casing, and forming the jig receiver by machining, in the molded casing.

With this, it is possible to accurately form the jig receiver.

In this case, the step of forming the jig receiver by machining may include forming the first guide, the second guide, and the third guide by the use of an identical, computer numerical controlled machine tool.

With this, it is possible to accurately form the jig receiver.

A wearable display according to still another embodiment of the present technology includes a first optical section, a second optical section, and a casing.

The first optical section emits image light.

The second optical section is connected to the first optical section and outwardly emits the image light.

The casing includes a first guide that is disposed at a center portion and has a round hole shape, a second guide that is disposed at a first end portion and includes a recess portion having a flat shape other than a circle, and a third guide that is disposed a second end portion, which is arranged approximately symmetrically to the first end portion with respect to the center portion, and includes a recess portion.

Effects

As described above, in accordance with the present technology, it is possible to provide a wearable display by which the positional accuracy between optical components when assembled can be improved, a manufacturing method therefor, and a casing for a wearable display.

It should be noted that the effect described here is not necessarily limitative and may be any effect described in the present disclosure.

BRIEF DESCRIPTION OF DRAWINGS

FIGS. 2A and 2B A cross-sectional view schematically showing configurations of a first optical section and a second optical section of the wearable display.

FIG. 6 An enlarged perspective view showing a configuration of a second guide of the jig receiver of the wearable display.

FIG. 7 An enlarged perspective view showing a configuration of a third guide of the jig receiver of the wearable display.

FIG. 9 A perspective view explaining ST114 of FIG. 8.

FIG. 17 A bottom view of the casing showing a configuration of the jig receiver according to Modified Example 3 of this embodiment.

DESCRIPTION OF PREFERRED EMBODIMENTS

Hereinafter, embodiments according to the present technology will be described with reference to the drawings.

[Configuration of Wearable Display]

Figure 1:
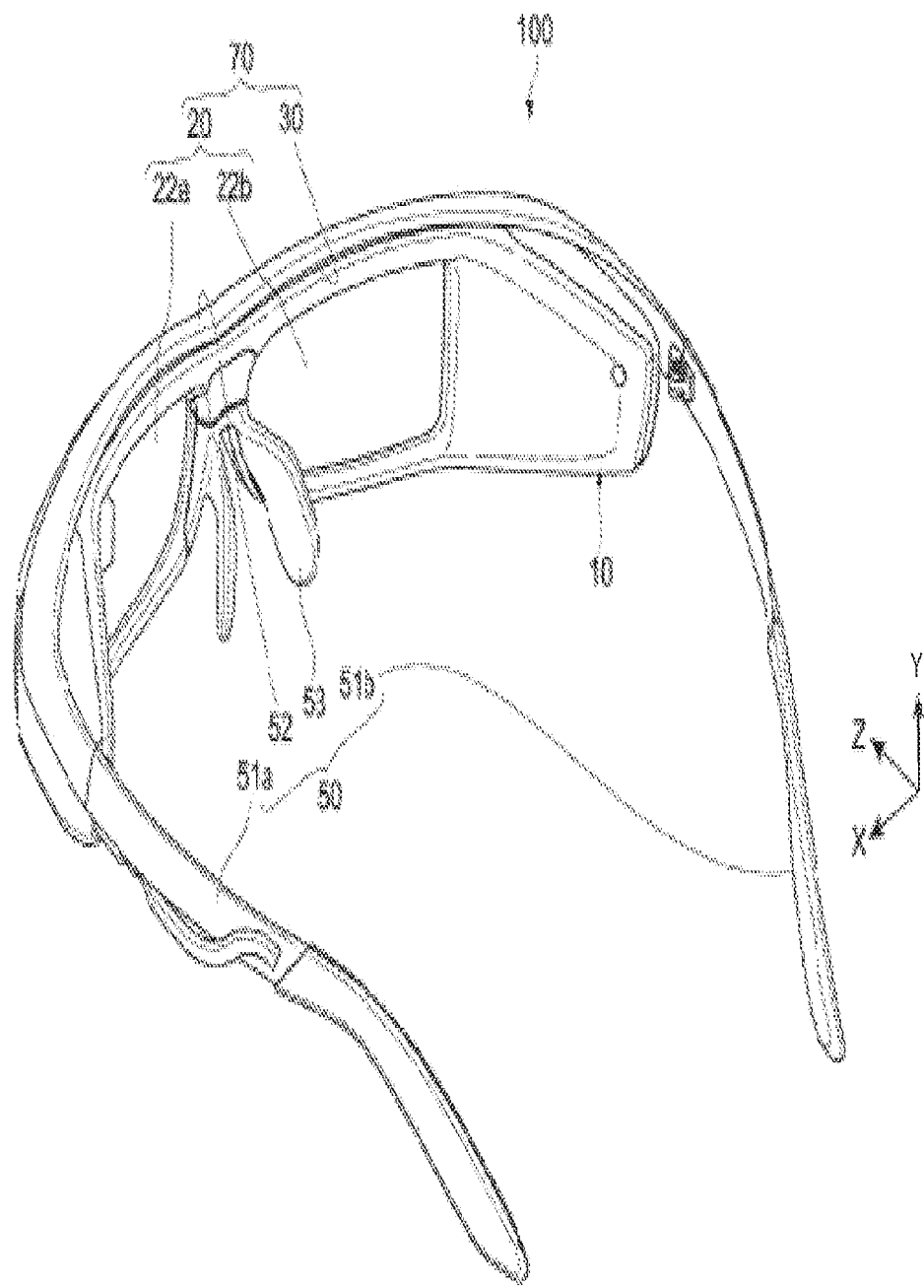
FIG. 1 An overall perspective view showing a wearable display according to an embodiment of the present technology.

FIG. 1 is an overall perspective view showing a wearable display according to an embodiment of the present technology. As shown in the figure, a wearable display 100 is configured as a see-through HMD formed in an eyeglass shape.

In the figures, X-, Y-, and Z-axes are three axis directions orthogonal to one another. The X-axis indicates left- and right-hand directions. The Y-axis indicates height (upper and lower) directions. The Z-axis indicates front and rear (front and back) directions.

As shown in the figure, the wearable display 100 includes a first optical section 10, a main body 70, a jig receiver 40, and a worn section 50.

The first optical section 10 is configured to be capable of emitting light.

The main body 70 includes a second optical section (optical section) 20 and a casing 30.

The second optical section 20 is connected to the first optical section 10 and configured to be capable of outwardly emitting incident light as image light.

The casing 30 supports the second optical section 20.

The jig receiver 40 is provided in the casing 30. The jig receiver 40 can be used as a jig receiver for a jig used in a manufacturing process for the wearable display 100 as will be described later. Note that the jig receiver 40 is not shown in FIG. 1.

The worn section 50 is connected to the casing 30 and configured to be wearable by the user.

Hereinafter, configurations of the respective sections will be described in detail.

(First Optical Section)

FIGS. 2A and 2B are cross-sectional views schematically showing configurations of the first optical section 10 and the second optical section 20. FIG. 2A shows a configuration for emitting image light for the left eye. FIG. 2B shows a configuration for emitting image light for the right eye.

As shown in FIG. 2A, the first optical section 10 includes a first lighting unit 11a and a first light modulation unit 12a that generate image light for the left eye.

The first lighting unit 11a includes a light source, a light pipe that guides light emitted from the light source, a polarizing plate, a diffusion plate, and the like (not shown). The light emitted from the first lighting unit 11a enters the first light modulation unit 12a.

The first light modulation unit 12a includes a light modulator and a deflection element (not shown). The light modulator is constituted of, for example, a light-reflective liquid-crystal display element. The deflection element is constituted of, for example, a polarization beam splitter. The deflection element allows light of the light entering from the first lighting unit 11a, which has a particular deflection component, to enter the light modulator. At the same time, the deflection element emits light of the light entering from the first lighting unit 11a, which is reflected from the light modulator, toward the second optical section 20.

The first lighting unit 11a and the first light modulation unit 12a may be held by a holding tool (not shown) and located at a predetermined position.

Note that, as shown in FIG. 2B, the first optical section 10 further includes a second lighting unit 11b and a second light modulation unit 12b that generate image light for the right eye. Configurations thereof are the same as the configurations of the first lighting unit 11a and the first light modulation unit 12a for the left eye, and hence the descriptions thereof will be omitted.

(Second Optical Section)

In this embodiment, the second optical section 20 is configured as a virtual-image optical system capable of guiding the image light generated at the first optical section 10 and enabling the wearer (user) to view a virtual image.

As shown in FIG. 2A, the second optical section 20 includes, as the configuration for emitting the image light for the left eye, a first collimating optical element 21a, a first light guiding plate 22a, a first input-side hologram grating 23a, and a first output-side hologram grating 24a.

The first collimating optical element 21a generates, for example, a plurality of parallel light fluxes having different angles of view from the image light entering from the first optical section 10 and emits the parallel light fluxes to the first light guiding plate 22a. Regarding the configuration of the first collimating optical element 21a, the first collimating optical element 21a may have a special shape such as a triangular prism or a deformed rectangular prism or may be a unitized element constituted of a combination of lenses.

The first light guiding plate 22a is configured to be capable of outwardly emitting the image light for the left eye. Note that the phrase "outwardly emitting" refers to emitting outside the second optical section 20 (wearable display 100). The first light guiding plate 22a has a thin, approximately parallel plate shape. The first light guiding plate 22a is configured as a first light transmitting plate provided corresponding to the left eye of the user. The first light guiding plate 22a is provided such that the first light guiding plate 22a can be opposed to the left eye of the user when worn. The first light guiding plate 22a allows the image light to enter from the first collimating optical element 21a, guides the image light therein, and emits the image light toward the left eye of the user.

Both of the first input-side hologram grating 23a and the first output-side hologram grating 24a are provided inside the first light guiding plate 22a and may be configured as, for example, reflective volume hologram gratings.

The first input-side hologram grating 23a refracts and reflects the light fluxes, which have entered from the first collimating optical element 21a, at an angle satisfying a total internal reflection condition on the first light guiding plate 22a while maintaining the parallelism of the light fluxes.

The first output-side hologram grating 24a refracts and reflects the light fluxes travelling through the first light guiding plate 22a, toward the left eye of the user.

On the other hand, as shown in FIG. 2B, the second optical section 20 includes, as the configuration for emitting the image light for the right eye, a second collimating optical element 21b, a second light guiding plate 22b, a second input-side hologram grating 23b, and a second output-side hologram grating 24b.

The second light guiding plate 22b is configured to be capable of outwardly emitting the image light for the right eye. The second light guiding plate 22b is configured as a second light transmitting plate provided corresponding to the right eye of the user. Specifically, the second light guiding plate 22b is provided such that the second light guiding plate 22b can be opposed to the right eye of the user when worn.

Configurations thereof are the same as the configurations of the first collimating optical element 21a, the first light guiding plate 22a, the first input-side hologram grating 23a, and the first output-side hologram grating 24a for displaying the image for the left eye, and hence the descriptions thereof will be omitted.

If a relative position relationship between the second optical section 20 and the first optical section 10 changes, a light guiding path of light entering the second optical section 20 from the first optical section 10 changes. Thus, it becomes impossible for the second optical section 20 to provide a desired virtual image to the user. That is, in order for the wearable display 100 to provide a favorable image to the user, the relative position relationship between the second optical section 20 and the first optical section 10 is very important.

(Casing)

Figure 3:
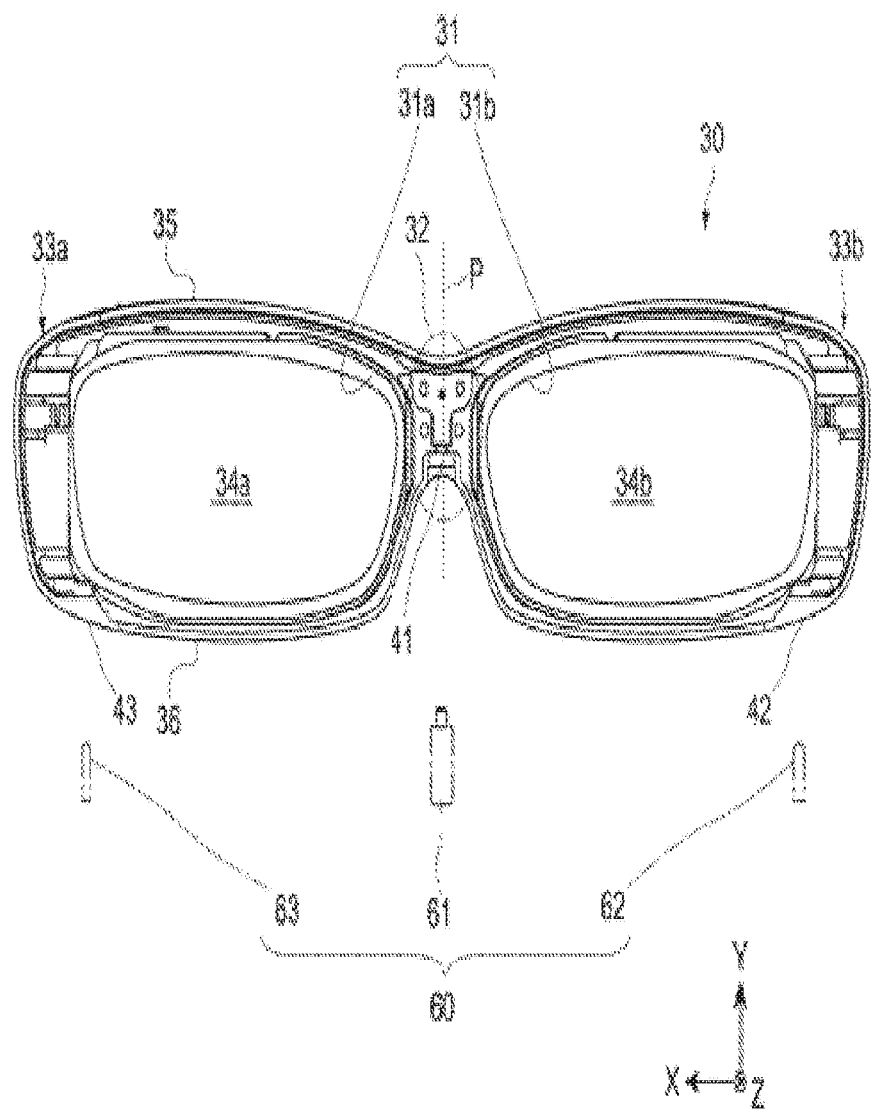
FIG. 3 A rear view showing a configuration of a casing of the wearable display.
Figure 4:
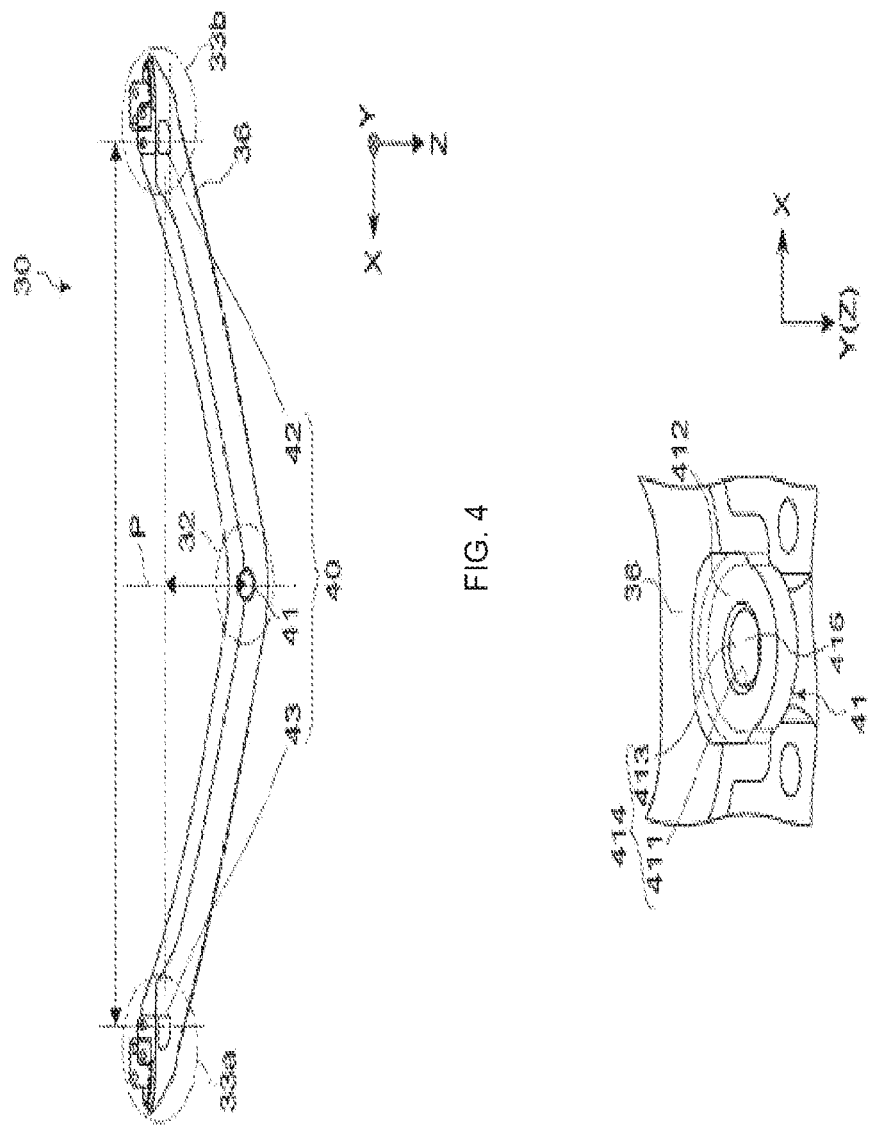
FIG. 4 A bottom view showing the configuration of the casing of the wearable display.

FIG. 3 is a rear view showing a configuration of the casing 30. FIG. 4 is a bottom view showing a configuration of the casing 30.

As shown in those figures, the casing 30 is formed in an eyeglass frame shape as a whole. The casing 30 may have a thickness of approximately 0.5 to 2.0 mm. Here, the term "thickness" refers a thickness between a surface facing forward in the Z-axis direction and a surface facing rearward in the Z-axis direction.

The casing 30 includes a center portion 32, a first end portion 33a, and a second end portion 33b. The first end portion 33a is spaced apart from the center portion 32 in the X-axis and the Z-axis direction. The second end portion 33b is arranged symmetrically to the first end portion 33a with respect to a plane (YZ-plane) P that passes through the center portion 32 and is orthogonal to the X-axis direction.

In addition, the casing 30 includes a first support 31a and a second support 31b. The first support 31a supports the first light guiding plate 22a and is provided between the center portion 32 and the first end portion 33a. The second support 31b supports the second light guiding plate 22b and is provided between the center portion 32 and the second end portion 33b.

The first support 31a is formed in a circumference of an aperture 34a in which the first light guiding plate 22a may be disposed. The first support 31a is configured to be capable of accurately positioning the first light guiding plate 22a with respect to the casing 30. The first support 31a is configured to be capable of being in contact with, for example, a periphery of a main surface and side surfaces of the first light guiding plate 22a and may have a structure such as a protrusion for preventing a shift and the like of the first light guiding plate 22a.

Note that the second support 31b is also formed in a circumference of an aperture 34b in which the second light guiding plate 22b may be disposed and configured similar to the first support 31b.

Further, the first support 31a and the second support 31b constitute a support 31.

The center portion 32 may be positioned at the center of the casing 30 and connected to the worn section 50 to be described later.

The first end portion 33a constitutes a left end portion of the casing 30.

The second end portion 33b constitutes a right end portion of the casing 30.

Note that the right end portion of the casing 30 may be the first end portion 33b and the left end portion of the casing 30 may be the second end portion 33a.

The casing 30 further includes an upper surface 35 and a bottom surface 36. The upper surface 35 is capable of being arranged facing a head side of the user when worn. The bottom surface 36 is opposed to the upper surface 35 in the Y-axis direction. The bottom surface 36 is capable of being arranged facing a foot side of the user when worn.

The upper surface 35 and the bottom surface 36 are configured to be plane symmetric with respect to a virtual YZ plane passing through the center portion 32 and the casing 30 is also configured to be plane symmetric with respect to the YZ plane as a whole.

Further, the upper surface 35 and the bottom surface 36 are tilted rearward in the Z-axis direction toward the first and second end portions 33a, 33b from the center portion 32. With this, the first and second supports 31a, 31b are also provided to be tilted rearward in the Z-axis direction, and hence the first and second light guiding plates 22a, 22b are also provided to be tilted rearward in the Z-axis direction.

(Worn Section)

As shown in FIG. 1, the worn section 50 includes a first temple portion 51a, a second temple portion 51b, a front portion 52, and a nose pad 53. The first temple portion 51a can be worn on the left-hand side of the user when worn. The second temple portion 51b can be worn on the right-hand side of the user when worn. The front portion 52 connects the first and second temple portions 51a, 51b.

The front portion 52 is provided along the upper surface 35 of the casing 30. For example, the front portion 52 is connected to the casing 30 in the center portion 32. The front portion 52 may be connected to a hole or the like formed in the center portion 32, for example, with a screw or the like. At this time, by a spring or the like being inserted between the screw and the hole, the worn state of the worn section 50 can be adjusted by changing the tightened state of the screw.

The first and second temple portions 51a, 51b are connected to the front portion 52, not the casing 30. Therefore, even if the first and second temple portions 51a, 51b is deformed, the casing 30 is not deformed. With this, also when worn, the shape of the second optical section 20 attached to the casing 30 is not changed, and hence it is possible to provide a favorable image to the user.

The nose pad 53 is fixed to the center portion 32.

Note that the center portion 32 is provided with an attachment mechanism (not shown) of lenses for vision correction. That mechanism is exposed when the nose pad 53 is removed and may be configured to hold, for example, lenses for vision correction or eyeglasses for vision correction.

(Jig Receiver)

As shown in FIGS. 3 and 4, the jig receiver 40 includes a first guide 41, a second guide 42, and a third guide 43. The jig receiver 40 is provided in the casing 30 such that at least two of the first, second, and third guides 41, 42, 43 are spaced apart from each other in the X-axis direction and at least two of the first, second, and third guides 41, 42, 43 are spaced apart from each other in the Z-axis direction. In this embodiment, the jig receiver 40 is provided in the bottom surface 36 of the casing 30. The jig receiver 40 is used for placing the casing 30 on a jig 60 including first, second, and third protrusions 61, 62, 63 as will be described later.

The first guide 41 is configured to be capable of supporting the first protrusion 61 and is arranged at the center portion 32, for example.

The second guide 42 is configured to be capable of supporting the second protrusion 62 and is arranged at the second end portion (first end portion) 33b, for example.

The third guide 43 is configured to be capable of supporting the third protrusion 63 and is arranged at the first end portion (second end portion) 33a, for example.

Figure 5:
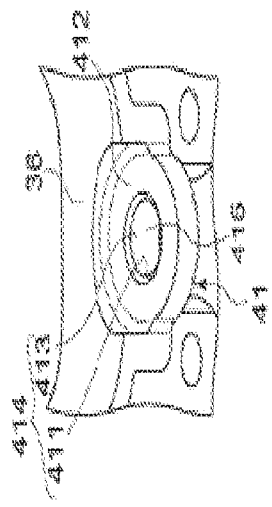
FIG. 5 An enlarged perspective view showing a configuration of a first guide of a jig receiver of the wearable display.

FIG. 5 is an enlarged perspective view showing a configuration of the first guide 41.

As shown in the figure, the first guide 41 includes a first surface 411 crossing the X-axis direction, a second surface 412 crossing the Y-axis direction, and a third surface 413 crossing the Z-axis direction. The first guide 41 has a round hole shape as a whole.

In this embodiment, the first surface 411 is configured as a curved surface including a region approximately orthogonal to the X-axis direction.

Similarly, the third surface 413 is configured as a curved surface including a region approximately orthogonal to the Z-axis direction.

Further, the second surface 412 is configured as a flat surface approximately orthogonal to the Y-axis direction.

In this embodiment, the first guide 41 further includes a hole portion 415 including an inner peripheral surface 414 including the first surface 411 and the third surface 412. The shape of the inner peripheral surface 414 is determined such that the inner peripheral surface 414 can insert the first protrusion 61 (see FIG. 3, FIG. 11, and the like) therein and limit movement of the first protrusion 61 in the hole portion 415 in the X-axis direction and the Z-axis direction. For example, the inner peripheral surface 414 is formed in a shape of an inner surface of a cylinder.

In the inner peripheral surface 414, the first surface 411 is configured as the region approximately orthogonal to the X-axis direction and the third surface 413 is configured as the region approximately orthogonal to the Z-axis direction.

Further, in this embodiment, the second surface 412 is configured as the flat surface continuous with the hole portion 415 and the hole portion 415 is configured as a through-hole formed toward the upper surface 35 from the second surface 412. In this embodiment, that through-hole is formed along the Y-axis direction.

FIG. 6 is an enlarged perspective view showing a configuration of the second guide 42.

As shown in the figure, the second guide 42 includes a fourth surface 421 crossing the Y-axis direction and a fifth surface 422 crossing the Z-axis direction. The second guide 42 includes a recess portion having a flat shape other than a circle (shape as viewed in Y-axis direction) as a whole. In this embodiment, the fourth surface 421 is approximately orthogonal to the Y-axis direction and the fifth surface 422 is approximately orthogonal to the Z-axis direction.

In this embodiment, the second guide 42 includes a first recess portion 423 formed toward the upper surface 35 from the bottom surface 36.

More specifically, the first recess portion 423 includes a first depressed surface 424 including the fourth surface 421 and a side surface 425 that includes the fifth surface 422 and is continuous with the fourth surface 421.

The first depressed surface 424 is constituted of the fourth surface 421, which is flat as a whole, for example.

The fifth surface 422 is configured as a region of the side surface 425, which is, for example, on a front side in the Z-axis direction and orthogonal to the Y-axis direction.

FIG. 7 is an enlarged perspective view showing a configuration of the third guide 43.

As shown in the figure, the third guide 43 includes a sixth surface 431 crossing the Y-axis direction and includes a recess portion having a flat shape other than a circle as a whole. In this embodiment, the sixth surface 431 is approximately orthogonal to the Y-axis direction.

The third guide 43 includes a second depressed surface 433 including the sixth surface 431 and further includes a second recess portion 432 formed toward the upper surface 35 from the bottom surface 36. The second depressed surface 433 is constituted of the sixth surface 431, which is flat as a whole. Note that the second recess portion 432 may include a side surface 434 continuous with the second depressed surface 433.

[Manufacturing Method for Wearable Display]

Figure 8:
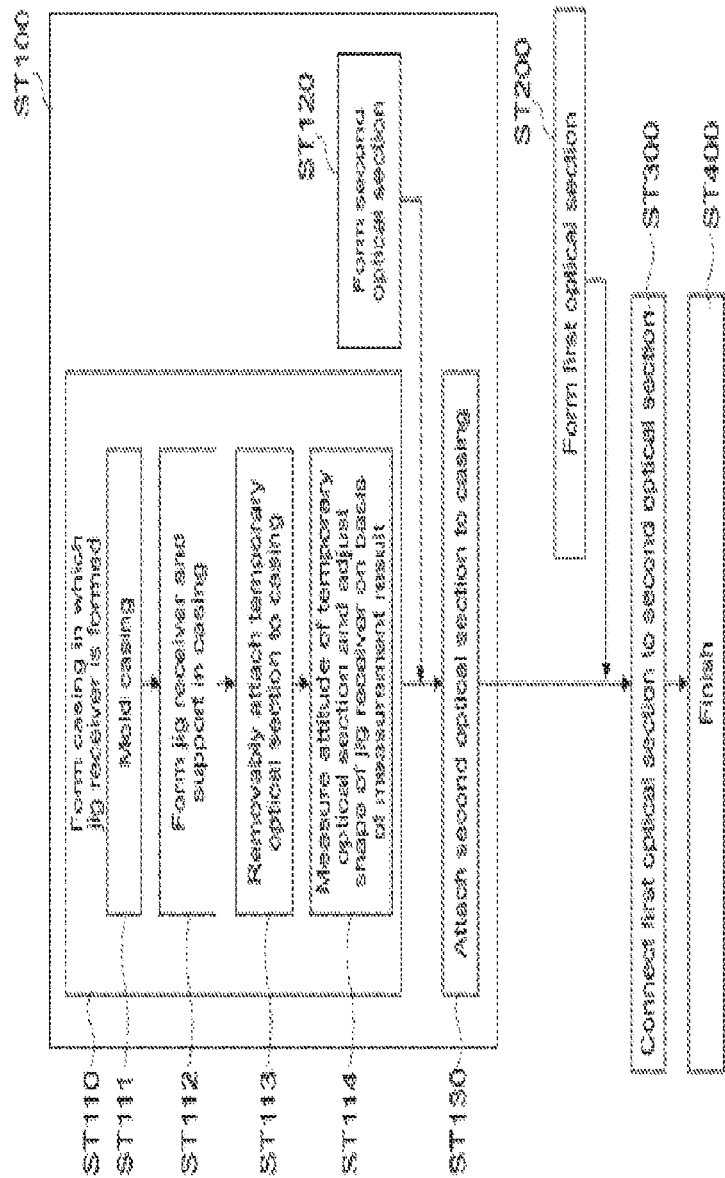
FIG. 8 A flowchart showing a manufacturing method for the wearable display.

FIG. 8 is a flowchart showing a manufacturing method for the wearable display 100.

As shown in the figure, the manufacturing method according to this embodiment includes
a step (ST100) of forming the main body 70 including the casing 30 in which the jig receiver 40 is formed and the second optical section 20 capable of emitting image light,
a step (ST200) of forming the first optical section 10,
a step (ST300) of placing the main body 70 on the jig 60 and connecting the first optical section 10 that emits image light to the second optical section 20, and a finishing step (ST400). Hereinafter, the respective steps will be described.

(Step of Forming Main Body (ST100))

The step (ST100) of forming the main body 70 according to this embodiment includes
a step (ST110) of forming the casing 30 in which the jig receiver 40 is formed, a step (ST120) of forming the second optical section 20, and
a step (ST130) of attaching the second optical section 20 to the casing 30.

(Step of Forming Casing in which Jig Receiver is Formed (ST110))

In this step, first of all, the casing 30 is molded (ST111). With this, the casing 30 in which the jig receiver 40 is not formed can be formed. As the material for the casing 30, a high strength, light-weight material is used. For example, a metal material such as Mg and Al and a resin material such as fiber reinforced plastics is used. Here, Mg is used as the material for the casing 30. As a molding method, for example, injection molding can be applied. Note that, at this point of time, the first support 31*a* and the second support 31*b* (support 31) also do not need to be formed.

Subsequently, the jig receiver 40 and the support 31 capable of supporting the second optical section 20 are formed in the casing 30 (ST112). The jig receiver 40 can be formed in the molded casing 30 by machining such as cutting. A computer numerical controlled machine tool, for example, is used for the machining. With this, the first guide 41, the second guide 42, and the third guide 43 can be formed by the use of an identical, computer numerical controlled machine tool.

Further, the support 31 also may be formed by machining as in the jig receiver 40. In addition, the support 31 may be formed by machining using the identical machine tool used for the jig receiver 40 at the same time.

Subsequently, a temporary optical section that can be supported by the support 31 is removably attached to the casing 30 (ST113). The temporary optical section may include a first temporary light guiding plate and a second temporary light guiding plate. The first temporary light guiding plate has a shape identical to the shape of the first light guiding plate 22*a* that can be supported by the first support 31*a*. The second temporary light guiding plate has a shape identical to the shape of the second light guiding plate 22*b* that can be supported by the second support 32*a*. The first and second temporary light guiding plates both are light transmissive plates such as glass plates and acrylic plates and have a configuration in which a reflective film or the like is formed on a surface thereof depending on needs. A method of attaching the first and second temporary light guiding plates is not particularly limited as long as the first and second temporary light guiding plates are removably attached.

Subsequently, the casing 30, to which the temporary optical section has been attached, is placed on the jig 60, the attitude of the temporary optical section is measured, and the shape of the jig receiver 40 is adjusted on the basis of a measurement result (ST114).

FIG. 9 is a perspective view explaining this step. Note that, in the figure, the illustration of the temporary optical section is omitted.

As shown in the figure, the jig 60 includes a supporting table 64, the first protrusion 61, the second protrusion 62, and the third protrusion 63. The first, second, and third protrusions 61, 62, 63 are all protruded from the supporting table 64 in the Y-axis direction, for example.

In this step, first of all, the casing 30 is placed on the jig 60 with the first, second, and third surfaces 411, 412, 413 of the first guide 41 being supported by the first protrusion 61, the fourth and fifth surfaces 421, 422 of the second guide 42 being supported by the second protrusion 62, and the sixth surface 431 of the third guide 43 being supported by the third protrusion 63. The details will be described later.

With the casing 30 being placed on the jig 60, the attitude of the temporary optical section is measured by an optical measurement apparatus such as a laser auto collimator measuring the angle or the like of a surface of the temporary light guiding plate.

On the basis of a measurement result, the shape of the jig receiver 40 is adjusted to obtain a desired attitude of the temporary optical section. The desired attitude is prescribed as, for example, a numerical value that can be measured by the optical measurement apparatus. When the shape of the jig receiver 40 is adjusted, the adjustment can be easily performed by additionally machining the jig receiver 40 by the use of the computer numerical controlled machine tool.

Note that, after this step, the temporary optical section is removed from the casing.

(Step of Forming Second Optical Section (ST120))

In this step, first of all, the first hologram gratings 23*a*, 24*a* are formed in the first light guiding plate 22*a*, which is light transmissive. Further, the first hologram gratings 23*a*, 24*a* can be constituted of light reflective films such as aluminum films, dielectric material-stacked films, or the like. Subsequently, the first light guiding plate 22*a* and the first collimating optical element 21*a* are connected to each other. The connection is performed with an adhesive such as a light curing resin. However, other adhesives may be used and the connection may be performed by screwing or the like.

Further, the second hologram gratings 23*b*, 24*b* are similarly formed in the second light guiding plate 22*b* and the second light guiding plate 22*b* and the second collimating optical element 21*b* are connected to each other.

As the material for the first and second collimating optical elements 21*a*, 21*b* and the first and second light guiding plates 22*a*, 22*b*, a transmissive material such as a transparent resin, glass, and ceramics is used. For example, polycarbonate or PET (polyethylene terephthalate) is used as the transparent resin.

(Step of Attaching Second Optical Section (ST130))

In this step, the first light guiding plate 22*a* and the second light guiding plate 22*b* subjected to the step (ST120) of forming the second optical section 20 are respectively attached to the first support 31*a* and the second support 31*b* of the casing 30. At this time, the both can be bonded and fixed to each other with an adhesive such as a light curing resin.

Note that, as in ST114, the casing 30 to which the second optical section 20 has been attached may be placed on the jig 60, the attitude of the second optical section 20 may be measured, and the shape of the jig receiver 40 may be adjusted on the basis of a measurement result.

(Step of Forming First Optical Section (ST200))

In this step, for example, the components of the first lighting unit 11*a* and the components of the first light modulation unit 12*a* for the left eye are arranged at predetermined positions by the use of the holder (not shown) or the like. Similarly, the components of the second lighting unit 11*b* and the components of the second light modulation unit 12*b* for the right eye are arranged at predetermined positions by the use of the holder (not shown) or the like. With this, the first optical section 10 can be formed.

(Step of Connection between First Optical Section and Second Optical Section (ST300))

Figure 10A:
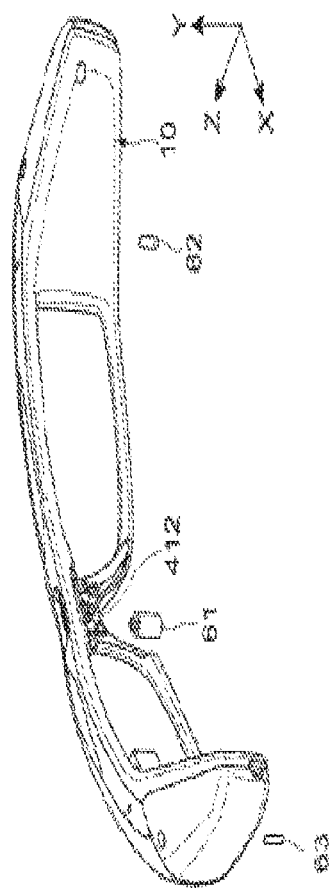
FIGS. 10A and 10B A perspective view explaining ST300 of FIG. 8.
Figure 10B:
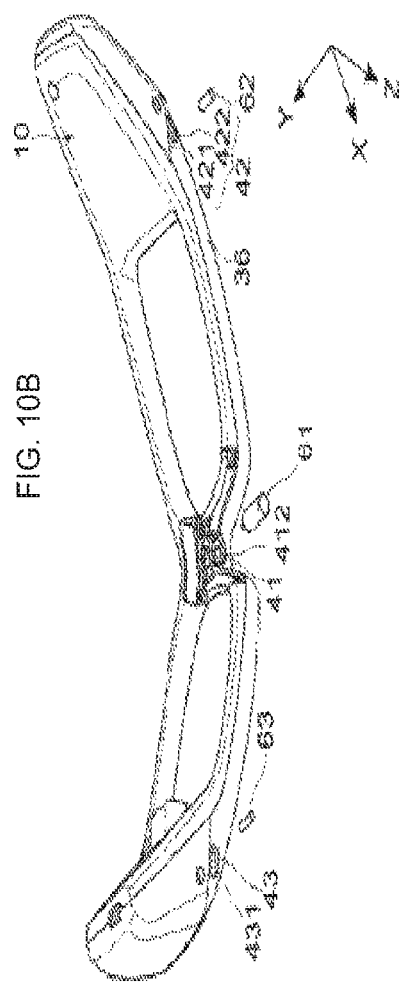

FIGS. 10A and 10B are perspective views showing a state in which the first optical section 10 is connected to the second optical section 20 with the casing 30 being placed on the jig 60. FIGS. 10A and 10B show the state as viewed in different directions. The jig 60 in this step can be a jig identical to the jig in ST114 or a jig having a shape identical to the shape of the jig in ST114.

Also referring to the figure, also in this step, as in ST114, the casing 30 is placed on the jig 60 with the first protrusion 61 being supported by the first, second, and third surfaces 411, 412, 413 of the first guide 41 after adjustment, the second protrusion 62 being supported by the fourth and fifth surfaces 421, 422 of the second guide 42, and the third protrusion 63 being supported by the sixth surface 431 of the third guide 43. The details will be described later.

With the casing 30 being placed on the jig 60, the first optical section 10 is connected to the second optical section 20. This connection is performed with an adhesive such as a light curing resin. However, other adhesives may be used and the connection may be performed by screwing or the like.

(Finishing Step (ST400))

In this step, the worn section 50 is connected to the casing 30. Specifically, members including the first temple portion 51a, the second temple portion 51b, and the front portion 52 shown in FIG. 1 are formed and the front portion 52 is connected to the casing 30. As a connection method, the front portion 52 can be fixed with a screw or the like in a hole formed in the casing 30, for example. Further, an attachment mechanism for the lenses for vision correction and the nose pad 53 are fixed to the center portion 32.

Further, in this step, the jig receiver 40 may be covered. For example, the second guide 42 and the third guide 43 may be covered with caps or the like. Further, the first guide 41 may be covered with the nose pad 53. With this, the configuration of the jig receiver 40 can be invisible after manufactured. Thus, the aesthetic appearance thereof can be improved.

Further, in this step, the first optical section 10 may be supplied with electric power, the wearable display 100 may be placed on the jig 60, and a final inspection of optical characteristics may be carried out.

In addition, the first optical section 10 is wiredly or wirelessly connected to an input apparatus (not shown), a communication apparatus, a battery, or the like.

In the above-mentioned manner, the wearable display 100 is manufactured.

As described above, in accordance with the manufacturing method according to this embodiment, the attitude of the second optical section 20 attached to the casing 30 can be measured with the casing 30 being supported by the jig 60 through the jig receiver 40, and the shape of the jig receiver 40 can be adjusted on the basis of a measurement result. With this, by placing the casing 30 on the identical jig 60 or a jig having an identical shape to the shape of the jig 60, the second optical section 20 can be maintained in the desired attitude and the first optical section 10 can be connected to the second optical section 20 in that attitude. Therefore, it is possible to provide a desired light guiding path of the image light and a desired spatial position of an image (virtual image) generated from the image light, and hence it is possible to provide a favorable image to the user.

Hereinafter, the action of the jig receiver 40 that supports the jig 60 will be described.

[Action of Jig Receiver]

Figure 11:
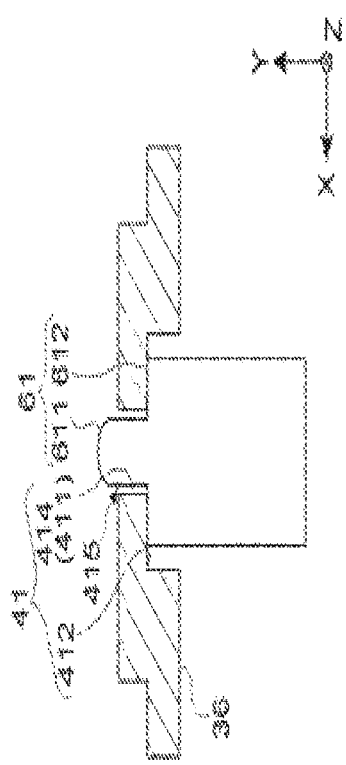
FIG. 11 A schematic cross-sectional view showing a configuration of the first guide.

FIG. 11 is a schematic cross-sectional view showing a configuration of the first guide 41 that supports the first protrusion 61 as viewed in the Z-axis direction.

As shown in the figure, the first protrusion 61 includes a tip end portion 611 and a step portion 612. The step portion 612 is continuous with the tip end portion 611 and has a plane orthogonal to the Y-axis direction. The tip end portion 611 is formed in a columnar shape having an axis direction in the Y-axis direction.

Referring to the figure and FIG. 5, the first guide 41 supports the first protrusion 61 while determining a position of the first protrusion 61 in a direction of each of the first, second, and third surfaces 411, 412, 413. Specifically, the first guide 41 allows the tip end portion 611 to be inserted into the hole portion 415 and allows the step portion 612 to be held in contact with the second surface 412.

The hole portion 415 has such a diameter that the tip end portion 611 can be attached and removed and movement of the tip end portion 611 in the hole portion 415 in an XZ-plane can be limited. For example, the hole portion 415 has a diameter slightly larger than the diameter of the tip end portion 611 by approximately 0.005 to 0.1 mm. With this, the hole portion 415 including the first surface 411 and the second surface 412 enables the tip end portion 611 to be easily attached and removed and can sufficiently suppress displacement with respect to the first protrusion 61 in the X-axis direction and the Z-axis direction.

Further, the second surface 412 is held in contact with the step portion 612. Thus, the second surface 412 can limit displacement with respect to the first protrusion 61 in the Y-axis direction.

Figure 12:
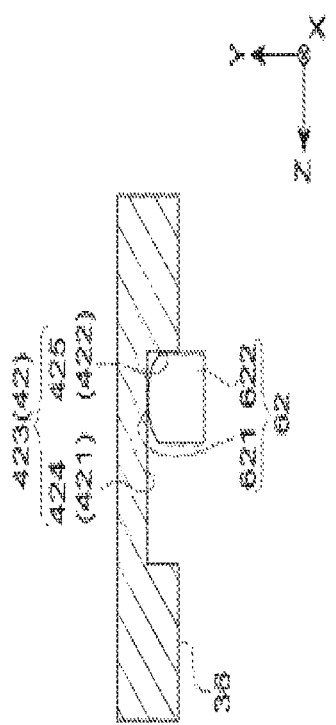
FIG. 12 A schematic cross-sectional view showing a configuration of the second guide.

FIG. 12 is a schematic cross-sectional view showing a configuration of the second guide 42 that supports the second protrusion 62 as viewed in the X-axis direction.

As shown in the figure, the second protrusion 62 includes an end surface 621 and a shaft portion 622 and is protruded in the Y-axis direction as a whole. The shaft portion 622 is formed in a columnar shape extending in the Y-axis direction.

Referring to the figure and FIG. 6, the second guide 42 supports the second protrusion 62 while determining a position of the second protrusion 62 in each direction of the fourth and fifth surfaces 421, 422. Specifically, the second guide 42 engages the second protrusion 62 with the first recess portion 423.

More specifically, first of all, the second guide 42 can limit displacement with respect to the second protrusion 62 in the Y-axis direction by allowing the end surface 621 of the second protrusion 62 to be held in contact with the first depressed surface 424.

Here, as shown by the arrow mark of FIG. 4, the second guide 42 is spaced apart from the first guide 41 and the third guide 43 in the X-axis direction. In addition to this, displacement with respect to the second protrusion 62 in the Y-axis direction is limited, and hence rotation in the second guide 42 around the Z-axis about the first guide 41 or the third guide 43 is limited.

Similarly, the second guide 42 is spaced apart from the first guide 41 also in the Z-axis direction. In addition to this, displacement with respect to the second protrusion 62 in the Y-axis direction is limited, and hence rotation in the second guide 42 around the X-axis about the first guide 41 is limited.

In addition, the second guide 42 can limit displacement with respect to the second protrusion 62 in the Z-axis direction by allowing the outer peripheral surface of the shaft portion 622 to be held in contact with the fifth surface 422 of the side surface 425 toward the Z-axis direction. With this, rotation of the second guide 42 around the Y-axis about the first guide 41 is limited.

Figure 13:
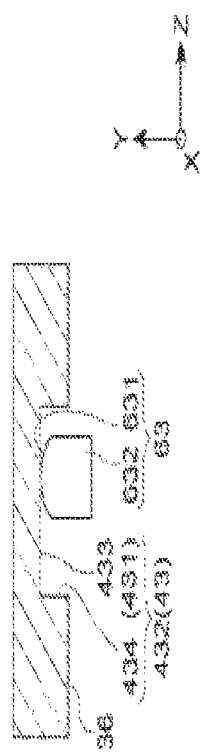
FIG. 13 A schematic cross-sectional view showing a configuration of the third guide.

FIG. 13 is a schematic cross-sectional view showing a configuration of the third guide 43 that supports the third protrusion 63 as viewed in the X-axis direction.

As shown in the figure, as in the second protrusion 62, the third protrusion 63 includes an end surface 631 and a shaft portion 632 and is protruded in the Y-axis direction as a whole. The shaft portion 632 is formed in a columnar shape extending in the Y-axis direction.

The third guide 43 supports the third protrusion 63 while determining a position of the third protrusion 63 in the direction of the sixth surface 431. Specifically, the third protrusion 63 is engaged with the second recess portion 432.

More specifically, the third guide 43 can limit displacement with respect to the third protrusion 63 in the Y-axis direction by allowing the end surface 631 of the third protrusion 63 to be held in contact with the second depressed surface 433.

Here, as shown in FIG. 4, the third guide 43 is spaced apart from the first guide 41 and the second guide 43 in the X-axis direction. With this, as in the second guide 42, rotation of the third guide 43 around the Z-axis about the first guide 41 or the second guide 42 is limited.

Similarly, the third guide 43 is spaced apart from the first guide 41 also in the Z-axis direction. In addition to this, displacement with respect to the third protrusion 63 in the Y-axis direction is limited, and hence rotation of the third guide 43 around the X-axis about the first guide 41 is limited.

Note that the side surface 434 of the third guide 43 may be spaced apart from an outer peripheral surface of the shaft portion 632. With this, it is possible to sufficiently exert the effect of limiting the rotation of the second guide 42 around the Y-axis.

As described above, the jig receiver 40 can limit the displacement of the casing 30 with respect to the jig 60 in the three axis directions including the X-axis, Y-axis, and Z-axis directions and rotation of the casing 30 with respect to the jig 60 around the three axes including the X-axis, the Y-axis, and the Z-axis.

That is, the first guide 41 can limit the displacement of the casing 30 with respect to the jig 60 in the X-axis, Y-axis, and Z-axis directions.

Further, the second guide 42 can limit the rotation of the casing 30 with respect to the jig 60 around the Y-axis.

In addition, the second guide 42 and the third guide 43 can limit the rotation of the casing 30 around the X-axis and the Z-axis by limiting rotation about the first guide 42.

Here, the wearable display 100 according to an example was manufactured and the positional accuracy thereof with respect to the jig 60 was assessed.

The jig receiver 40 according to this example had the following dimension. Specifically, the hole portion 415 of the first guide 41 had a diameter larger than the diameter of the tip end portion 51 of the first protrusion 61 by 0.02 mm. In the X-axis direction, the second guide 42 was spaced apart from the third guide 43 by about 124 mm and was spaced apart from the first guide 41 by about 62 mm. In the Z-axis direction, each of the second guide 42 and the third guide 43 was spaced apart from the first guide 41 by about 23 mm.

The wearable display 100 according to such an example was manufactured and placed on the jig 60. Displacement values of the casing 30 with respect to the jig 60 in the three axis directions and rotation values around the three axes were measured. Note that, as the displacement and rotation values, values resulting from component tolerances and values resulting from misplacement, which occurs when an identical sample, was repeatedly placed were derived.

As a result, regarding the both of the values resulting from component tolerances and the values resulting from misplacement, measurement values around the above-mentioned axis directions and axes were values within a range sufficiently allowable from an optical perspective. In particular, although an allowable range of rotation around each of the X-axis, the Y-axis, and the Z-axis was equal to or smaller than about 0.4°, even rotation resulting from component tolerances was very slight, that is, equal to or smaller than 0.05°. Further, no rotation resulting from misplacement was detected. Further, although an allowable range of displacement in each of the axis directions was equal to or smaller than about 0.1 mm, no displacement in the Y-axis direction was detected irrespective of the displacement resulting from component tolerances and the displacement resulting from misplacement. The displacement in the X-axis direction and the Z-axis direction resulted from the above-mentioned differences in the diameter and fell within the allowable range.

From the above-mentioned results, it was confirmed that the jig receiver 40 can actually effectively prevent the displacement and the rotation of the casing 30 with respect to the jig 60.

[Action and Effect of this Embodiment]

As described above, in accordance with this embodiment, when the casing 30 is placed on the jig 60, it is possible to regulate the attitude of the casing 30 with respect to the jig 60 with high accuracy. With this, when the casing 30 is placed on the jig 60 and the second optical section 20 and the first optical section 10, which are attached to the casing 30, are connected to each other, it becomes possible to improve the positional accuracy between those components.

Further, the first guide 41 is arranged at the center portion 32 and the second guide 42 and the third guide 43 are respectively arranged at the second end portion 33b and the first end portion 33a. With this, both of the distance between each of the second guide 42 and the third guide 43 and the first guide 41 and the distance between the second guide 42 and the third guide 43 can be sufficiently ensured. Therefore, in comparison with the case where those distances are short, it is possible to keep rotational angles of the casing 30 around the X-axis and the Z-axis smaller, which result from the displacement of the second guide 42 and the third guide 43 with respect to the jig 60 in the Y-axis direction. With this, it is possible to more effectively limit the rotation of the casing 30 around the X-axis and the Z-axis.

Further, the jig receiver 40 is provided in the bottom surface 36. With this, when the attitude of the temporary optical section or the second optical section 20 is measured by the use of the jig 60, the same attitude as the attitude when worn by the user can be applied. It can contribute to improvement of measurement efficiency and measurement accuracy. In addition, the jig receiver 40 is provided in the bottom surface 36 difficult for the user to see, the aesthetic appearance thereof can be improved.

Further, the first guide 41 can be configured in a space-saving manner by configuring the hole portion 415 of the first guide 41 as the through-hole formed toward the upper surface 35 from the second surface 412 formed in the bottom surface 36. With this, it is possible to increase the degree of freedom of configurations other than the jig receiver 40.

Further, the side surface 425 of the second guide 42 is configured to be capable of being in contact with the second protrusion 62, and hence it is possible to more reliably limit the displacement of the second guide 42 with respect to the second protrusion 62 in the Z-axis direction. Thus, the positional accuracy can be improved.

In addition, in accordance with the manufacturing method according to this embodiment, it is possible to measure the attitude of the second optical section 20 and adjust the shape of the jig receiver 40 with the casing 30, to which the second optical section 20 has been attached, being placed on the jig 60. With this, in a step as the subsequent step in which the main body 70 is placed on the jig 60 and the first optical section 10 and the second optical section 20 are connected with each other, it is possible to further improve the positional accuracy of the first optical section 10 and the second optical section 20.

Further, also in the manufacture of the casing 30, by adjusting the shape of the jig receiver 40 on the basis of the attitude of the temporary optical section attached to the casing 30 in advance, it is possible to easily adjust, in the subsequent step, the shape of the jig receiver 40 based on the attitude of the second optical section 20.

Further, it is possible to improve the shape accuracy of the jig receiver 40 by forming the jig receiver 40 by machining after the casing 30 is molded.

In addition, it is possible to further increase the shape accuracy of the jig receiver 40 by forming the first guide 41, the second guide 42, and the third guide 43 by the use of the identical, computer numerical controlled machine tool.

Modified Example 1

The shape of the first guide 41 is not limited to the shape described above.

Figure 14:
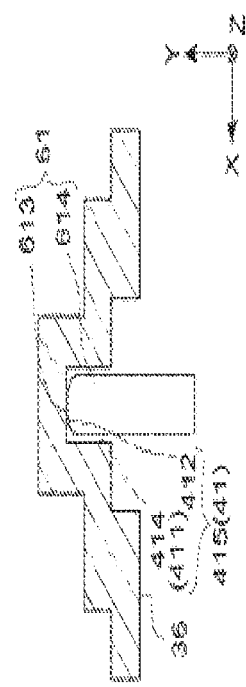
FIG. 14 A schematic cross-sectional view showing a configuration of the first guide according to Modified Example 1 of this embodiment.

FIG. 14 a cross-sectional view showing a configuration of the first guide 41 according to Modified Example 1 as viewed in the Z-axis direction.

As shown in the figure, the hole portion 415 is a hole formed toward the upper surface 35 from the bottom surface 36 and the second surface 412 may constitute a bottom portion of the hole portion 415. In this case, the first protrusion 61 does not need to include the step portion and may include an end surface 613 and a shaft portion 614. The end surface 613 can be held in contact with the second surface 412.

Also with such a configuration, it is possible to exert the same action as the first guide 41.

In addition, although not shown in the figure, the inner peripheral surface of the hole portion 415 is not limited to the curved surface. The inner peripheral surface of the hole portion 415 may be constituted of a plurality of flat surfaces including at least the first surface 411 and the third surface 413. Further, the first guide 41 is not limited to be configured to include the hole portion 415. The first guide 41 only needs to be configured to include at least the first, second, and third surfaces 411, 412, 413.

Modified Example 2

Also, the shape of the second guide 42 is not limited to the shape described above.

Figure 15:
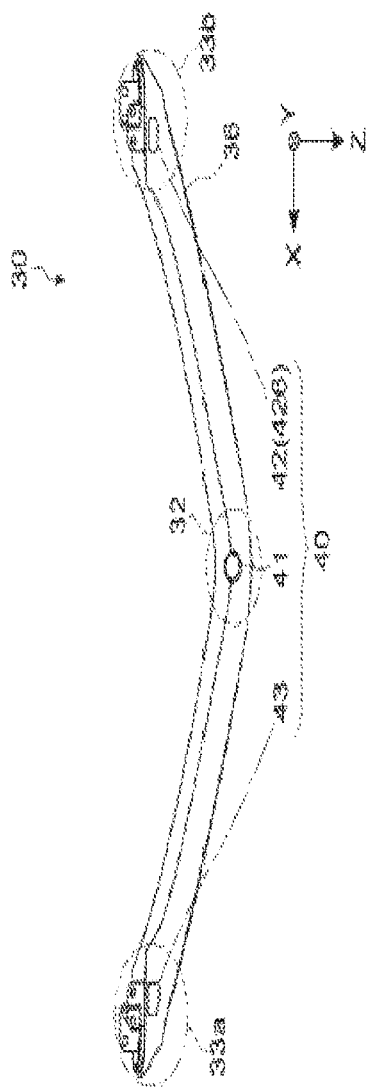
FIG. 15 A bottom view of the casing showing a configuration of the second guide according to Modified Example 2 of this embodiment.
Figure 16:
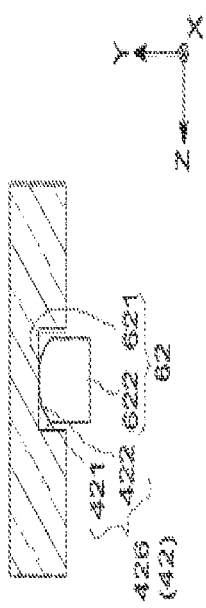
FIG. 16 A schematic cross-sectional view showing a configuration of the second guide.

FIG. 15 is a bottom view of the casing 30 showing a configuration of The second guide 42 according to Modified Example 2. FIG. 16 is a cross-sectional view showing a configuration of the second guide 42 according to Modified Example 2 as viewed in the X-axis direction.

As shown in those figures, the second guide 42 may include a hole portion 426 that includes an inner peripheral surface including the fourth surface 421 and is formed toward the upper surface 35 from the bottom surface 36. The hole portion 426 is formed in an oval shape, a rectangle shape having round corners, or the like as viewed from the Y-axis direction. For example, the hole portion 426 may extend in the X-axis direction as shown in FIG. 15 or may extend along a direction in which the casing 30 extends toward the second end portion 33b from the center portion 32. The hole portion 426 can have any size as long as the second protrusion 62 can be attached and removed in the Y-axis direction and the movement of the second protrusion 62 in the hole portion 415 in the Z-axis direction can be limited. As shown in FIG. 16, the fifth surface 422 may constitute the bottom portion of the hole portion 426 or may be formed in the bottom surface 36 if the second protrusion 62 includes the step portion (see FIG. 11).

Also with such a configuration, the second guide 42 can sufficiently suppress displacement with respect to the second protrusion 62 in the Z-axis direction.

Further, although not shown in the figure, the shape of the third guide 43 is also not limited to the above-mentioned shape. The third guide 43 may have the same configuration as the second guide 42 shown in FIG. 15.

Modified Example 3

The positions of the first, second, and third guides 41, 42, 43 are not limited to the above-mentioned positions. The jig receiver 40 only needs to be provided in the casing 30 such that at least two of the first, second, and third guides 41, 42, 43 are spaced apart from each other in the X-axis direction and at least two of the first, second, and third guides 41, 42, 43 are spaced apart from each other in the Z-axis direction.

For example, each of the first guide 41, the second guide 42, and the third guide 43 only needs to be arranged corresponding to any one of the center portion 32, the first end portion 33a, and the second end portion 33b in a one-to-one relationship.

FIG. 17 is a bottom view of the casing 30 showing a configuration of the jig receiver 40 according to Modified Example 3.

As shown in the figure, the first guide 41 is arranged at the first end portion 33a, the second guide 42 is arranged at the center portion 32, and the third guide 43 is arranged at the second end portion 33b. Also with such a configuration, displacement in each of the first, second, and third guides 41, 42, 43 with respect to the jig 60 in the Y-axis direction is limited, and hence it is possible to limit the rotation of the casing 30 with respect to the jig 60 around the X-axis and the Z-axis. Further, in this modified example, the second guide 42 may include the hole portion 426 as described in Modified Example 2.

Alternatively, the first guide 41 may be arranged at the center portion 32 and each of the second guide 42 and the third guide 43 may be arranged corresponding to either one of the first end portion 33a and the second end portion 33b in a one-to-one relationship. That is, the second guide 42 may be arranged at the first end portion 33a and the third guide 43 may be arranged at the second end portion 33b.

Modified Example 4

Further, the jig receiver 40 is not limited to the configuration in which the jig receiver 40 is provided in the bottom surface 36. The jig receiver 40 may be provided in the upper surface 35 or may be provided in a front surface or a rear surface of the casing 30.

Modified Example 5

The configuration of the casing 30 is not limited to the above-mentioned configuration. For example, the first and second supports 31a, 31b may be arranged in a line along the X-axis direction rather than being tilted in the Z-axis direction. In this case, the first and second end portions 33a, 33b may be protruded rearward in the Z-axis direction.

Further, the worn section 50 is not limited to the worn section 50 configured separately from the casing 30 as the example. The temples and the like may be integrally attached to the casing.

The wearable display 100 is also not limited to the eyeglass shape. Alternatively, the wearable display 100 may have an appropriate wearable configuration, for example, a goggle shape or a hat shape.

In addition, the wearable display 100 is not limited to the configuration of the see-through HMD and may be a non-see-through HMD. Also in this case, by applying the present technology, it is possible to improve the positional accuracy of the second optical section, which includes a display or the like and outwardly emits image light, and the first optical section, which includes a light or the like and emits light to the display or the like, when assembled.

In addition, the wearable display 100 is also not limited to the embodiment in which the wearable display 100 is mounted on the head. The wearable display 100 may be wearable to a wrist, an arm, and the like as long as the wearable display 100 can present images to the user.

Modified Example 6

Further, the first optical section 10 and the second optical section 20 are not limited to the configuration in which the first optical section 10 and the second optical section 20 respectively emit the image light for the left eye and the image light for the right eye. The first optical section 10 and the second optical section 20 may be configured to emit either one of the image light for the left eye and the image light for the right eye.

In this case, for example, the wearable display 100 may include a first light transmitting plate arranged corresponding to the left eye of the user and a second light transmitting plate aligned with the first light transmitting plate in the X-axis direction and arranged corresponding to the right eye of the user. The second optical section 20 may include at least one of the first light transmitting plate and the second light transmitting plate. That is, at least one of the first light transmitting plate and the second light transmitting plate functions as the above-mentioned light guiding plate and the second optical section 20 includes a light guiding plate capable of outwardly emitting either image light of the image light for the left eye and the image light for the right eye.

With this, it is possible to simplify the configurations of the first optical section 10 and the second optical section 20 and to achieve downsizing.

Modified Example 7

Further, the manufacturing method for the wearable display 100 is also not limited to the above-mentioned method.

For example, depending on the accuracy for machining the jig receiver 40, either one or both of the steps of adjusting the shape of the jig receiver in ST114 do not need to be provided.

Further, the method of forming the jig receiver 40 is also not limited to the machining. The jig receiver 40 may be formed by molding at the same time as the casing 30.

In addition, optical components made in advance may be used without the step of forming the first optical section and the step of forming the second optical section.

Further, the finishing step may also be omitted if necessary.

Modified Example 8

Although, in the above description, the first, second, and third protrusions 61, 62, 63 of the jig 60 are all protruded from the supporting table 64, the first, second, and third protrusions 61, 62, 63 of the jig 60 are not limited thereto.

For example, the first, second, and third protrusions 61, 62, 63 may be configured as jig pins separable from the supporting table 64. In this case, the casing 30 is placed on the jig 60 as described below.

First of all, the first, second, and third protrusions 61, 62, 63 are respectively supported by the first, second, and third guides 41, 42, 43. On the other hand, the first, second, and third recess portions are formed in the supporting table 64. The first, second, and third recess portions are respectively engaged with the first, second, and third protrusions 61, 62, 63. Then, the casing 30 is placed on the supporting table 64 by respectively engaging the first, second, and third protrusions 61, 62, 63 with the first, second, and third recess portions with the first, second, and third protrusions 61, 62, 63 being supported.

In this modified example, the first, second, and third guides 41, 42, 43 may respectively include first, second, and third hole portions. Due to the first, second, and third hole portions, the first, second, and third protrusions 61, 62, 63 can be attached and removed and the movements of the protrusions in the X-axis, the Y-axis, and the Z-axis directions are limited when the protrusions are inserted. The first hole portion includes the first to third surfaces, the second hole portion includes the fourth and fifth surfaces, and the third hole portion includes the sixth surface. With this, the first, second, and third guides 41, 42, 43 can limit displacement with respect to the first, second, and third protrusions 61, 62, 63 and it is possible to prevent those protrusions from falling.

In addition, the first recess portion includes at least the three surfaces crossing each of the X-axis, Y-axis, and Z-axis directions and it is possible to support the first protrusion 61 while determining the position of the first protrusion 61 in each direction of those three surfaces.

Further, the second recess portion includes at least the two surfaces crossing each of the Y-axis and Z-axis directions and it is possible to support the second protrusion 62 while determining the position of the second protrusion 62 in each direction of those two surfaces.

Further, the third recess portion includes at least one surface crossing the Y-axis direction and it is possible to support the third protrusion 63 while determining the position of the third protrusion 63 in the direction of this surface.

Also with the above-mentioned configurations, it is possible to regulate the attitude of the casing 30 with respect to the jig 60 with high accuracy. In addition, according to this modified example, the first, second, and third protrusions 61, 62, 63 are engaged with the jig receiver 40 in advance, and then positioning of those protrusions 61, 62, 63 with respect to the supporting table 64 is performed, and hence it is possible to prevent the casing 30 and the like from being damaged by the protrusions protruded from the supporting table 64.

Modified Example 9

In addition, the wearable display 100 is not limited to the configuration of the see-through HMD and may be a non-see-through HMD. Also in this case, by applying the present technology, it is possible to improve the positional accuracy of the second optical section that includes a display or the like and outwardly emits image light and the first optical section that includes a light or the like and emits light to the display or the like when assembled.

In addition, the present technology is not limited only to the above-mentioned embodiments and may be variously modified without departing from the essence of the present disclosure. Further, the above-mentioned embodiments and modified examples can be combined in any way and carried out unless any contradictions arise.

It should be noted that the present technology may also take the following configurations.

(1) A wearable display, including:
a first optical section capable of emitting light;
a main body including
a second optical section that is connected to the first optical section and capable of outwardly emitting the light as image light, and
a casing that supports the second optical section; and
a jig receiver including
a first guide capable of supporting a first protrusion of a jig while determining a position of the first protrusion in each direction of a first surface crossing a first axis direction, a second surface crossing a second axis direction orthogonal to the first axis direction, and a third surface crossing a third axis direction orthogonal to each of the first and second axis directions,
a second guide capable of supporting a second protrusion of the jig while determining a position of the second protrusion in each direction of a fourth surface crossing the second axis direction and a fifth surface crossing the third axis direction, and
a third guide capable of supporting a third protrusion of the jig while determining a position of the third protrusion in a direction of a sixth surface crossing the second axis direction, the jig receiver being provided in the casing such that at least two of the first, second, and third guides are spaced apart from each other in the first axis direction and at least two of the first, second, and third guides are spaced apart from each other in the third axis direction.

(2) The wearable display according to (1), in which
the casing includes
a center portion,
a first end portion spaced from the center portion in the first and third axis directions, and
a second end portion arranged symmetrically to the first end portion with respect to a plane which passes through the center portion and is orthogonal to the first axis direction, and the first guide, the second guide, and the third guide are arranged respectively corresponding to any one of the center portion, the first end portion, and the second end portion in a one-to-one relationship.

(3) The wearable display according to (2), in which
the first guide is arranged at the center portion, and
the second guide and the third guide are arranged respectively corresponding to either one of the first end portion and the second end portion in a one-to-one relationship.

(4) The wearable display according to (2) or (3), further including:
a first light transmitting plate arranged corresponding to a left eye of a user; and
a second light transmitting plate arranged corresponding to a right eye of the user, in which
the second optical section includes at least one of the first light transmitting plate and the second light transmitting plate, and
the casing includes
a first support that supports the first light transmitting plate and is arranged between the center portion and the first end portion, and
a second support that supports the second light transmitting plate and is arranged between the center portion and the second end portion.

(5) The wearable display according to any one of (1) to (4), in which
the casing includes
an upper surface capable of being arranged facing a head side of the user when worn, and
a bottom surface that is opposed to the upper surface in the second axis direction and capable of being arranged facing a foot side of the user when worn, and
the jig receiver is provided in the bottom surface.

(6) The wearable display according to (5), in which
the first guide further includes
a hole portion having an inner peripheral surface including the first surface and the third surface, and
the second surface is configured as a flat surface continuous with the hole portion.

(7) The wearable display according to (6), in which
the second surface is formed in the bottom surface, and
the hole portion is configured as a through-hole formed toward the upper surface from the second surface.

(8) The wearable display according to any one of (5) to (7), in which
the second guide further includes
a first recess portion including
a first depressed surface including the fourth surface, and
a side surface that includes the fifth surface and is continuous with the fourth surface, the first recess portion being formed toward the upper surface from the bottom surface.

(9) The wearable display according to any one of (5) to (8), in which
the third guide further includes
a second recess portion including
a second depressed surface including the sixth surface, the second recess portion being formed toward the upper surface from the bottom surface.

(10) The wearable display according to any one of (1) to (9), in which
the second optical section includes
a first light guiding plate capable of outwardly emitting image light for a left eye, and
a second light guiding plate capable of outwardly emitting image light for a right eye.

(11) The wearable display according to any one of (1) to (10), in which
the second optical section includes
a light guiding plate capable of outwardly emitting image light for at least either one of a left eye and a right eye.

(12) A casing for a wearable display, that is capable of supporting an optical section capable of outwardly emitting image light, the casing including:
a jig receiver including
a first guide capable of supporting a first protrusion of a jig while determining a position of the first protrusion in each direction of a first surface crossing a first axis direction, a second surface crossing a second axis direction orthogonal to the first axis direction, and a third surface crossing a third axis direction orthogonal to each of the first and second axis directions,
a second guide capable of supporting a second protrusion of the jig while determining a position of the second protrusion in each direction of a fourth surface crossing the second axis direction and a fifth surface crossing the third axis direction, and a third guide capable of supporting a third protrusion of the jig while determining a position of the third protrusion in a direction of the sixth surface crossing the second axis direction, the jig receiver is provided in the casing such that at least two of the first, second, and third guides are spaced apart from each other in the first axis direction and at least two of the first, second, and third guides are spaced apart from each other in the third axis direction.

(13) A manufacturing method for a wearable display, the wearable display including
a first optical section capable of emitting light,
a main body including
a second optical section that is connected to the first optical section and capable of outwardly emitting the light as image light, and
a casing that supports the second optical section, and
a jig receiver including
a first guide capable of supporting a first protrusion of a jig while determining a position of the first protrusion in each direction of a first surface crossing a first axis direction, a second surface crossing a second axis direction orthogonal to the first axis direction, and a third surface crossing a third axis direction orthogonal to each of the first and second axis directions,
a second guide capable of supporting a second protrusion of the jig while determining a position of the second protrusion in each direction of a fourth surface crossing the second axis direction and a fifth surface crossing the third axis direction, and
a third guide capable of supporting a third protrusion of the jig while determining a position of the third protrusion in a direction of a sixth surface crossing the second axis direction, the jig receiver being provided in the casing such that at least two of the first, second, and third guides are spaced apart from each other in the first axis direction and at least two of the first, second, and third guides are spaced apart from each other in the third axis direction, the method including:
forming the main body; and
placing the main body on the jig with the first protrusion being supported by the first, second, and third surfaces of the first guide, the second protrusion being supported by the fourth and fifth surfaces of the second guide, and the third protrusion being supported by the sixth surface of the third guide, and connecting the first optical section to the second optical section.

(14) The manufacturing method for a wearable display according to (13), in which
the step of forming the main body includes
forming a casing in which the jig receiver is formed, and
attaching the second optical section to the casing.

(15) The manufacturing method for a wearable display according to (14), in which
the step of forming a casing in which the jig receiver is formed includes
forming the jig receiver and a support capable of supporting the second optical section, in the casing,
removably attaching a temporary optical section capable of being supported by the support, to the casing, and
placing the casing, to which the temporary optical section is attached, on the jig, measuring an attitude of the temporary optical section, and adjusting a shape of the jig receiver on the basis of a measurement result.

(16) The manufacturing method for a wearable display according to (14) or (15), in which
the step of forming a casing in which the jig receiver is formed includes
molding the casing, and
forming the jig receiver by machining, in the molded casing.

(17) The manufacturing method for a wearable display according to (16), in which
the step of forming the jig receiver by machining includes forming the first guide, the second guide, and the third guide by the use of an identical, computer numerical controlled machine tool.

(18) A wearable display, including:
a first optical section that emits image light;
a second optical section that is connected to the first optical section and outwardly emits the image light; and
a casing that supports the second optical section, the casing including
a first guide that is disposed at a center portion and has a round hole shape,
a second guide that is disposed at a first end portion and includes a recess portion having a flat shape other than a circle, and
a third guide that is disposed a second end portion, which is arranged approximately symmetrically to the first end portion with respect to the center portion, and includes a recess portion.

DESCRIPTION OF REFERENCE NUMERALS 10 first optical section
20 second optical section
30 casing
40 jig receiver
41 first guide
411 first surface
412 second surface
413 third surface
42 second guide
421 fourth surface
422 fifth surface
43 third guide
431 sixth surface
60 jig
61 first protrusion
62 second protrusion
63 third protrusion
70 main body

The invention claimed is:
1. A wearable display, comprising:
a first optical section;
a second optical section connected to the first optical section;
a casing that supports the second optical section; and
a jig receiver that includes:
a first guide;
a second guide; and
a third guide,
wherein the jig receiver is provided in the casing such that at least two of the first guide, the second guide, and the third guide are spaced apart from each other in a first axis direction.
2. The wearable display according to claim 1, wherein the casing includes:
a center portion;
a first end portion spaced from the center portion in the first axis direction and a third axis direction; and
a second end portion arranged symmetrically to the first end portion with respect to a plane which passes through the center portion and is orthogonal to the first axis direction, and
the first guide, the second guide, and the third guide are arranged respectively corresponding to one of the cen- ter portion, the first end portion, and the second end portion in a first one-to-one relationship.

3. The wearable display according to claim 2, wherein
the first guide is arranged at the center portion, and
the second guide and the third guide are arranged respectively corresponding to one of the first end portion or the second end portion in a second one-to-one relationship.

4. The wearable display according to claim 2, further comprising:
a first light transmitting plate arranged corresponding to a left eye of a user; and
a second light transmitting plate arranged corresponding to a right eye of the user, wherein
the second optical section includes at least one of the first light transmitting plate or the second light transmitting plate, and
the casing includes:
a first support that supports the first light transmitting plate and is arranged between the center portion and the first end portion; and
a second support that supports the second light transmitting plate and is arranged between the center portion and the second end portion.

5. The wearable display according to claim 1, wherein
the casing includes:
an upper surface configured to be arranged facing a head side of a user when worn; and
a bottom surface opposed to the upper surface in a second axis direction and configured to be arranged facing a foot side of the user when worn, and
the jig receiver is in the bottom surface.

6. The wearable display according to claim 5, wherein
the first guide further includes a hole portion having an inner peripheral surface including a first surface and a third surface, and
a second surface is configured as a flat surface continuous with the hole portion.

7. The wearable display according to claim 6, wherein
the second surface is formed in the bottom surface, and
the hole portion is configured as a through-hole formed toward the upper surface from the second surface.

8. The wearable display according to claim 5, wherein the second guide further includes:
a first recess portion including a first depressed surface including a fourth surface; and
a side surface that includes a fifth surface and is continuous with the fourth surface, wherein the first recess portion is toward the upper surface from the bottom surface.

9. The wearable display according to claim 5, wherein
the third guide further includes a second recess portion including a second depressed surface including a sixth surface, and
the second recess portion is toward the upper surface from the bottom surface.

10. The wearable display according to claim 1, wherein the second optical section includes:
a first light guiding plate configured to outwardly emit image light for a left eye; and
a second light guiding plate configured to outwardly emit image light for a right eye.

11. The wearable display according to claim 1, wherein the second optical section includes a light guiding plate configured to outwardly emit image light for at least one of a left eye or a right eye.

12. The wearable display according to claim 1, wherein the first optical section is configured to emit light.

13. The wearable display according to claim 1, wherein the second optical section is configured to outwardly emit light as image light.

14. The wearable display according to claim 1, wherein
the first guide is configured to support a first protrusion of a jig while determining a position of the first protrusion in each direction of a first surface crossing the first axis direction, a second surface crossing a second axis direction orthogonal to the first axis direction, and a third surface crossing a third axis direction orthogonal to each of the first axis direction and the second axis direction.

15. The wearable display according to claim 14, wherein at least two of the first guide, the second guide, and the third guide are spaced apart from each other in the third axis direction.

16. The wearable display according to claim 1, wherein the second guide is configured to:
support a second protrusion of a jig while determining a position of the second protrusion in each direction of a fourth surface crossing a second axis direction and a fifth surface crossing a third axis direction, and
the third guide is configured to support a third protrusion of the jig while determining a position of the third protrusion in a direction of a sixth surface crossing the second axis direction.

* * * * *